United States Patent [19]
Khambatta

[11] 4,325,183
[45] Apr. 20, 1982

[54] PROCESS FOR PRODUCING AN ELECTRICAL RESISTOR HAVING A METAL FOIL BONDED TO A CERAMIC OR GLASS-CERAMIC SUBSTRATE

[75] Inventor: Adi F. Khambatta, Whitley Bay, England

[73] Assignee: Welwyn Electric Limited, Northumberland, England

[21] Appl. No.: 36,707

[22] Filed: May 7, 1979

Related U.S. Application Data

[62] Division of Ser. No. 897,983, Apr. 20, 1978, abandoned, which is a division of Ser. No. 830,750, Sep. 6, 1977, abandoned.

[30] Foreign Application Priority Data

Sep. 7, 1976 [GB] United Kingdom ............... 36995/76
Mar. 2, 1977 [GB] United Kingdom ................. 8735/77

[51] Int. Cl.³ ............................................ H01C 17/28
[52] U.S. Cl. ..................................................... 29/621
[58] Field of Search ................. 29/621, 615; 428/209, 428/210; 427/96, 97, 101, 376 C; 156/89, 285

[56] References Cited

U.S. PATENT DOCUMENTS

| | | | |
|---|---|---|---|
| 2,564,738 | 8/1951 | Tank | 156/89 X |
| 2,824,364 | 2/1958 | Bovenkerk | 156/285 X |
| 2,827,393 | 3/1958 | Kadisel | 427/376.4 |
| 3,434,201 | 3/1969 | Cushman | 29/621 |
| 3,584,379 | 6/1971 | Loose | 29/621 X |
| 3,798,060 | 3/1974 | Reed et al. | 427/97 |
| 3,892,904 | 7/1975 | Tanaka | 428/209 |

Primary Examiner—Leon Gilden

[57] ABSTRACT

A process for producing an electrical resistor of a ceramic or glass-ceramic substrate with reentrant cavities or pores having directly adhered thereon a metallic foil, said foil substantially having the configuration of the adjoining surface of said substrate, comprises placing in direct contact a ceramic or glass-ceramic substrate with the required cavities or pores and a metallic foil of an electrically resistive material patterned to give a required electrical resistance value, maintaining the direct contact between the substrate and foil while subjecting the assembly to equal pressure from every side so as to adhere said foil to said substrate without any intervening bonding agent between the substrate and the foil, and securing electrically conductive terminals in electrical contact with spaced regions of said foil.

5 Claims, 4 Drawing Figures

PROCESS FOR PRODUCING AN ELECTRICAL RESISTOR HAVING A METAL FOIL BONDED TO A CERAMIC OR GLASS-CERAMIC SUBSTRATE

This is a division of application Ser. No. 897,983, filed Apr. 20, 1978, abandoned, which is a division of application Ser. No. 830,750 filed Sept. 6, 1977, abandoned.

BACKGROUND OF THE INVENTION

The present invention relates to a composite article comprising a substrate of ceramic or glass-ceramic material and a metallic foil, and to a process of making same. As used herein, the term "metallic foil" designates not only a foil composed of a single metal, but also a foil composed of a metal alloy or metal mixture such as a laminate.

DESCRIPTION OF THE PRIOR ART

It is known to bound a metallic foil member to a ceramic material member by introducing between the facing surfaces of said two members a malleable metal, placing the resulting assembly between metal plates of a press and applying pressure normal to the flat surfaces, while subjecting the assembly to elevated temperature.

This known process is unsuitable for bonding a thin metal foil directly to a ceramic or glass-ceramic substrate, especially when a non-flat substrate, e.g. a cylinder, is used.

SUMMARY OF THE INVENTION

It is a purpose of the present invention to enable direct bonding of a metallic foil to a ceramic or glass-ceramic substrate, the process for doing this not necessarily requiring an elevated temperature.

The present invention provides a composite article of a ceramic or glass-ceramic substrate having directly adhered thereon a metallic foil, said foil substantially having the configuration of the adjoining surface of said substrate, whereby adhesion of the foil to the substrate is achieved without any intervening bonding agent.

The present invention also provides a process for producing a composite article, which comprises placing in direct contact a ceramic or glass-ceramic substrate and a metallic foil, and maintaining the direct contact between them while subjecting the resulting assembly to equal pressure from every side, so as to adhere said foil to said substrate.

BRIEF DESCRIPTION OF THE DRAWINGS

The invention will be better understood by reference to the accompanying drawings in which.

Figures 1, 2:
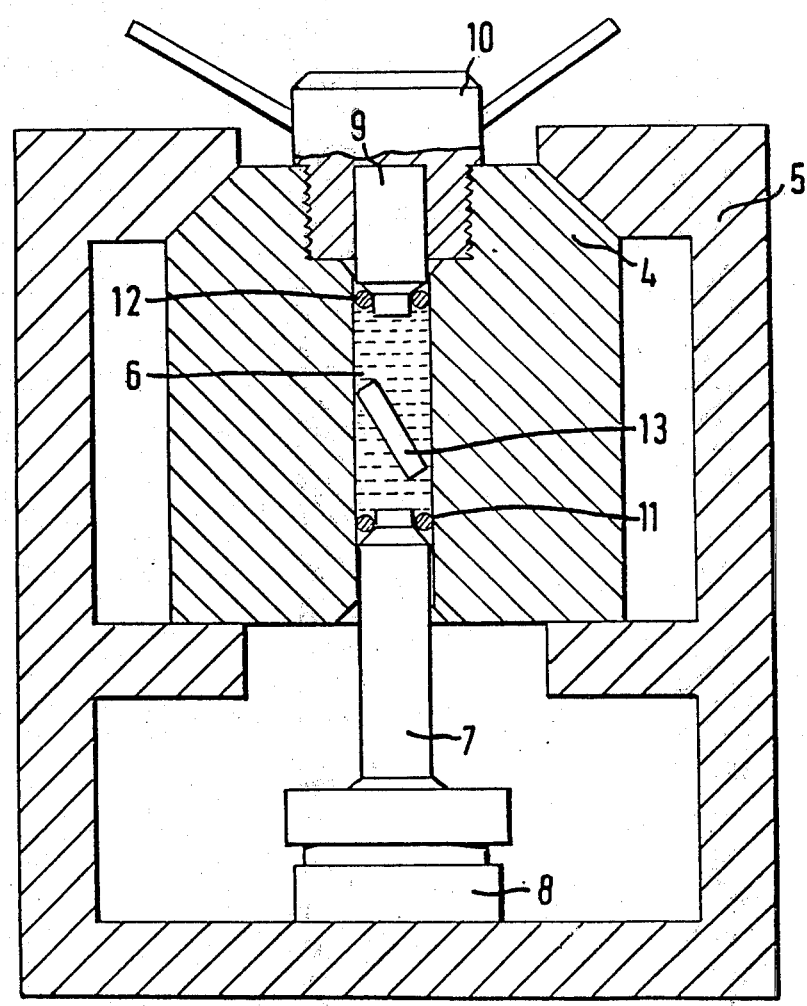
FIG. 1 shows a section through a cylindrical substrate having a foil head in contact therewith by a flexible envelope prior to application of isostatic conditions.
FIG. 2 shows a section through apparatus for applying pressure in the process of the invention.

It is important in the process of the invention to maintain the said substrate and said foil in direct contact while equal pressure from every side is applied, i.e. while isostatic treatment is given, until the foil adheres to the substrate; this is normally done by putting the foil-substrate assembly in a sealed, tightly fitting envelope from which air is preferably evacuated before sealing.

Preferably the surface of the substrate intended to be in contact with the foil is provided with small cavities or pores, e.g. by etching or mechanically abrading, the cavities being preferably reentrant ones.

The pressure in the process of the invention is sufficiently large to cause plastic deformation of the foil to substantially follow the configuration of the adjoining substrate surface without causing undesirable mechanical damage to the foil and/or substrate, whereby adhesion occurs, suitable pressures being, e.g., as low as 2 tons per square inch in the case of a soft metal such as lead, but higher in the case of harder metals or alloys such as nickel-chromium where pressures of about 80 tons per square inch may be needed, the upper limit being the point where damage may occur.

The isostatic treatment may be given via an oil, e.g. castor oil, or any other fluid, for example a gas, using known apparatus currently employed for compacting ceramic and metal powder, which apparatus is able to exert pressures of about 100 tons per square inch or more.

As indicated above, normally a sealed envelope is used in the process of the invention, this envelope must be impervious to fluid used to apply the pressure and sufficiently flexible to allow equal pressure from all sides to be exerted on the foil-substrate assembly. A plastics material is suitable, e.g. in the form of a sleeve fitting round the assembly and sealed at its ends, e.g. by heating; the envelope may be removed, e.g., by peeling or by a solvent or etchant, or may be left, depending upon the end use of the product.

The substrate may be of any desired shape, e.g. flat or curved, examples of suitable materials being porcelain, steatite, forsterite, alumina and ceramic materials containing alumina.

The foil may be, e.g., of aluminum, copper, nickel, nickel-chromium, nickel-copper, platinum, gold, silver, tin, lead, tantalum, molybdenum, or alloys thereof.

The composite article of the present invention is especially useful in the electronics industry: by appropriate choice of metallic foil to give the required electrical properties, e.g. electrical resistance, electrical stability and temperature coefficient of resistance, an electrical resistor or temperature sensor may be produced, electrically conductive terminals being provided, secured in electrical contact with the bonded foil, the resistance being capable of adjustment, e.g. by cutting using laser beam, cutting wheel or photo-etching techniques. Another use for the composite article is as an electrical conductor, or a magnetic device, e.g. an inductor.

In some cases it may be desirable to adhere (e.g. with an adhesive or by direct bonding) one face of the metallic foil, before the isostatic treatment, to a support member; of course, the latter must be sufficiently flexible to allow the isostatic treatment to be effected. The use of said support member enables the foil to be processed, e.g. by overall thinning, and/or by etching, cutting or abrading, to remove one or more selected portions of the film to form a desired pattern. Suitably, said support member may be of metal or plastics material, e.g. in the form of a sheet.

When the support member is a metal, it may be formed in situ on said foil by a metal deposition process (preferably electroplating) whereby the member and foil are adhered to one another directly and known electrolytic etching of the foil to produce a pattern becomes possible, thus enabling the production of a patterned electrical resistor and/or conductor. After the isostatic treatment, the metal support member is entirely or partly removed as and if required; any final trimming to the required value in the case of a resistor may be effected after isostatic treatment. When a curved substrate is used, the support member has the advantage of allowing patterning to be effected while the foil is flat on the support member.

DESCRIPTION OF THE PREFERRED EMBODIMENTS

Specific non-limitative examples of the invention, given by way of illustration, are given below, reference being made to the accompanying drawings.

EXAMPLE 1

The surface of a cylindrical alumina ceramic substrate 1 (25 mm long and 9 mm in diameter), manufactured by Rosenthal Technik AG of Marktredwitz, West Germany under the reference Rubalit 617, is etched, by immersing it in 50% nitric acid, so as to produce minute reentrant surface pores or cavities. The substrate is then thoroughly rinsed in deionized water while vibrating using ultrasonic energy, then heated for a few minutes at 1000° C. to 1400° C. to remove any absorbed water, and allowed to cool. A rectangular metal foil 2, e.g. about 3 μm thick, is then wrapped by hand round the substrate, the foil being such that the opposite edges of it do not meet, whereby a narrow gap (not shown), extending from one end of the substrate to the other, remains. A closely fitting tube 3 of flexible polyolefin about 0.005 inches thick is then slid over the foil and substrate assembly; one end of the tube is sealed, air is pumped from it and then the other end is heat sealed, so that a sealed flexible envelope is formed about the foil-substrate assembly and direct contact between the foil and substrate is maintained.

Referring now to FIG. 2, apparatus for providing isostatic conditions comprises a cylinder 4 of very high tensile strength steel and supported on a steel framework 5. The cylinder has a bore 6 into one end of which fits a slidable piston 7 which can be moved in the bore 6 by a hydraulic jack 8. The other end of the bore 6 is sealed by a plug 9 which is maintained in position by a cap 10 threaded into the cylinder 4. High pressure seals 11 and 12 are provided on the piston 7 and plug 9 respectively.

The cap 10 and plug 9 are removed and the assembly of FIG. 1, indicated by reference numeral 13, is inserted into the bore 6. A hydraulic fluid comprising, by volume, 90% castor oil and 10% methyl alcohol is then poured into the bore 6 and the plug 9 and cap 10 are replaced. The hydraulic jack 3 is then operated so as to pressurize the oil in the bore, whereby equal pressure from all sides is exerted on the assembly of FIG. 1, said pressure being from 80 to 130 tons per square inch, causing the foil to be pressed into the minute pores or cavities in the surface of the substrate and thus to follow the configuration of the latter whereby it becomes securely bonded to the substrate. The pressure is maintained for several seconds before the jack 8 is released. The assembly of FIG. 1 is removed from the bore 6 and any residual oil cleaned from the surface of the envelope 3, the latter being peeled off.

The resulting composite article may be processed to form an electrical resistor, as follows, a suitable foil 2 for this purpose being, for example, one having the composition:

| | |
|---|---|
| nickel | 75% by weight |
| chromium | 20% by weight |
| copper | 2.5% by weight |
| aluminum | 2.5% by weight. |

Electrically conductive resistor terminals in the form of metal caps (not shown), for example of nickel-iron or nickel-chromium, are pressed onto the ends of the substrate to form an inteference fit in electrical contact with the surface of the foil; alternatively, the foil may be welded to the caps, using, for example, a micro plasma welder.

The electrical resistance value of the resulting resistor, measured between its terminals, may be increased to a required value by forming a series of circumferential cuts or slits using, for example, a laser beam, cutting wheel, or photoetching techniques, said cuts or slits stopping short of the edges of the foil between which the narrow gap extends lengthwise along the substrate, so that a meandered electrical resistance path results between the terminals of the resistor.

EXAMPLE 2

A masking lacquer coating is put on one face of a metal foil, about 3 μm thick, for example of a nickel-chromium electrical resistance alloy. A very thin nickel strike and thereafter a layer of copper about 35 μm thick as the support member are then electroplated to the other face of the foil; the exposed copper surface is then bonded to a flat glass substrate with an adhesive and the lacquer coating removed from the foil with a solvent. Using known photographic techniques, a pattern of foil, e.g. a meandered track pattern of an electrical resistance element, covered with a photoresist film, is formed and the exposed regions of foil are electrolytically etched away in known manner, a low resistance path for the electric current being provided by the copper support member. The resulting patterned foil on the copper is then released from the glass substrate by softening the adhesive with a suitable solvent therefor and all traces of adhesive and photoresist are removed. The thickness of the copper member is then reduced to 10 to 15 μm by etching with nitric acid to enable subsequent isostatic treatment.

Figure 4:
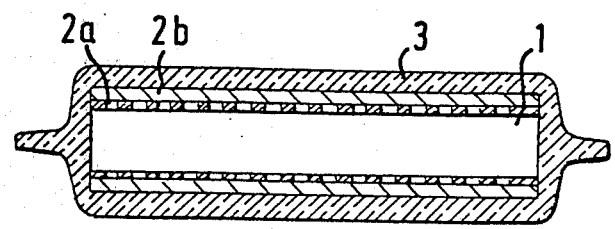
FIG. 4 shows a section through a cylindrical substrate having a patterned foil on a support member held in contact with the substrate by a flexible envelope prior to application of isostatic conditions.

As shown in FIG. 4 of the drawings, the patterned foil, indicated by reference numeral 2a, on the copper support member, indicated by reference numeral 2b, is placed on a cylindrical alumina substrate 1, the surface of which has been treated to produce reentrant surface cavities or pores as described in Example 1; the procedure described in Example 1 is followed up to the stage when the flexible envelope, indicated by reference numeral 3, has been peeled off. The copper support member is then etched from the foil and substrate, using nitric acid, leaving the patterned foil secured to the substrate. After applying in known manner terminals and, if desired, a protective covering of electrically insulating material, an electrical resistor is formed having a meandered track resistance element. Since the patterning of the foil was carried out prior to bonding the foil to the substrate, thereby achieving a desired electrical resistance value, it is unnecessary to undertake helixing, or other such patterning technique, of the foil after bonding it to the substrate.

For some applications it may be advantageous not to completely remove the copper membrane, but to leave portions thereof constituting, for example, terminations for the electrical resistor, such portions being suitably masked during the etching operation to remove the remaining copper.

EXAMPLE 3

A metal foil, about 3 μm thick and comprising, for example, a nickel-chromium electrical resistance alloy, is laminated to a plastics support member, e.g. of a commercially available polyester or polyimide, of about 12 μm in thickness by applying heat and pressure and using techniques well known in the art of printed circuit manufacture. The plastics support member is supported, with the foil uppermost, on a flat surface, using, for example, adhesive tape to secure it to the surface. The foil is then patterned and the subsequent procedure is as in Example 2, except that the thickness of the plastics support member is left unchanged until the end of the isostatic treatment, the flexible envelope being peeled off together with the plastics support member at the end of said treatment, leaving the patterned foil secured to the substrate.

As described in Example 2, terminals and, if desired, a protective coating may be applied to the product to produce an electrical resistor having a resistance element of meandered track form.

When it is desired to apply a metallic foil to a substrate so that the edges of the foil meet or overlap, the edges may be seam-welded together, using, for example, known electrical resistance welding, electron beam welding or micro plasma welding techniques. Alternatively, the foil may be in the form of a tube which forms a tight fit over the substrate.

When the foil is in the form of a tube or has its edges welded together and the composite article is processed to form an electrical resistor, a helical cut may be formed in the foil to increase its resistance to a desired value.

When a temperature sensor is required, a metallic foil whose electrical resistance varies appreciably with temperature is used, e.g. a platinum foil.

When an electrical circuit conductor or capacitor electrode is required, the substrate may be flat and the metallic foil may be, e.g., aluminum, gold or copper, it being possible to remove parts of the foil by abrading, cutting or etching to provide an array of conductors on the substrate.

Figure 3:
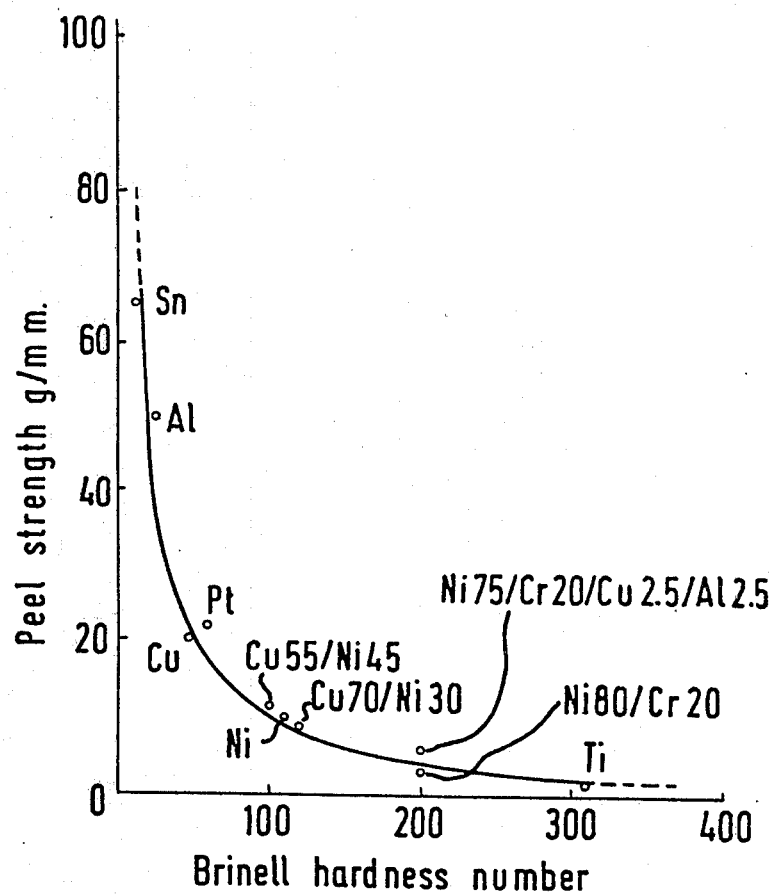
FIG. 3 shows a plot of peel strength versus hardness for a range of metal and alloy foils bonded to a ceramic substrate by the process of the invention under the conditions described below.

When the pool strength, i.e. the force per unit length required to remove a bonded foil from a substrate, is measured for a range of metal and alloy foils bonded by the above described procedure, this is found to depend on the hardness of the metal or alloy. In FIG. 3, examples are shown of the relationship between the peel strength for various metal and alloy foils and their Brinell hardness. The metals for which results are plotted in FIG. 3 are tin, aluminum, platinum, copper, nickel and titanium. Results for alloys comprising (i) 55% copper and 45% nickel, (ii) 70% copper and 30% nickel, (iii) 75% nickel, 20% chromium, 2.5% copper and 2.5% aluminum, (iv) 80% nickel and 20% chromium are also shown in FIG. 3.

Although the present invention is described herein with particular reference to specific details, it is not intended that such details shall be regarded as limitations upon the scope of the invention except insofar as included in the accompanying claims.

What is claimed is:
1. A process for producing an electrical resistor which comprises:
   placing a ceramic or glass-ceramic substrate, the surface of which is provided with small cavities or pores, and a self-supporting metallic foil into a sealed tightly fitting fluid impervious envelope with adjoining surfaces of said substrate and said foil in direct contact with one another;
   introducing said fluid impervious envelope into a fluid;
   applying to said fluid a pressure of at least two tons per square inch but less than that at which undesirable damage is caused to said foil and/or to said substrate, whereby an equal pressure is applied from every side to said foil and said substrate and said foil is plastically deformed to intrude into and be retained within said small cavities or pores of the adjoining surface of said substrate so that direct adhesion of said foil to said substrate is achieved without any intervening bonding agent; and
   securing electrically conductive terminals in electrical contact with spaced apart regions of said foil.
2. A process according to claim 1 in which said cavities or pores in the surface of the substrate are reentrant ones.
3. A process according to claim 1 in which the foil is bonded to a curved substrate.
4. A process according to claim 1 in which said metallic foil is an electrically resistive material and is patterned so as to give the required electrical resistance value to said electrical resistor.
5. A process according to claim 1 further comprising the step of adhering the face of said foil away from said substrate to a support member.

* * * * *